F. G. LYNDE.
FEEDER BELLOWS.
APPLICATION FILED FEB. 7, 1913.
1,098,453.
Patented June 2, 1914.
2 SHEETS—SHEET 2.
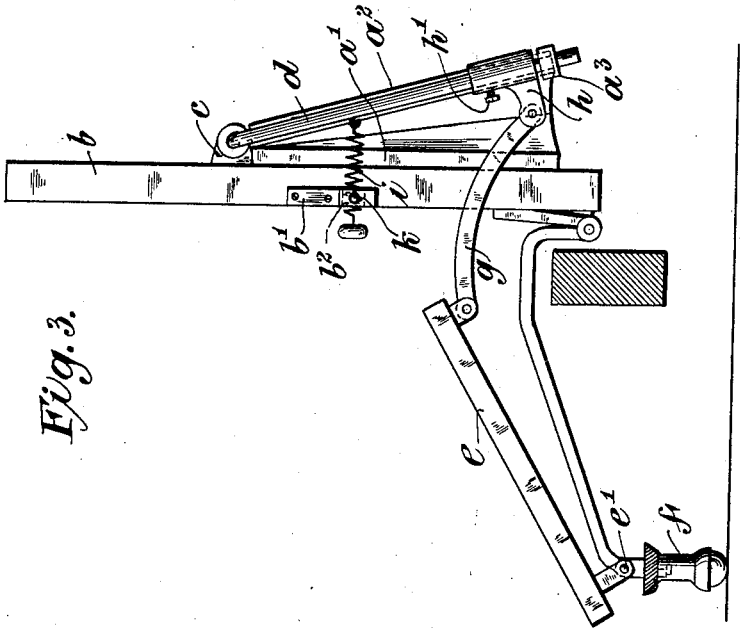
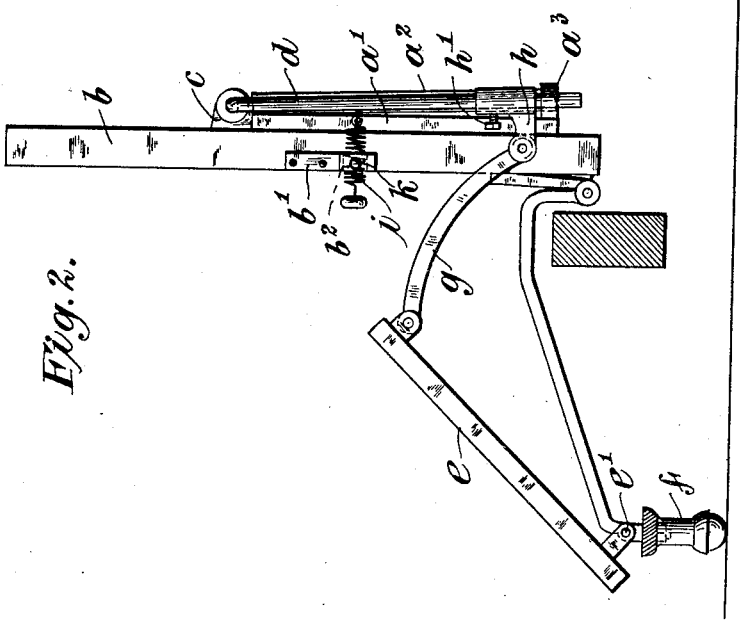
Witnesses:
Inventor
Frank G. Lynde
By his Attorneys

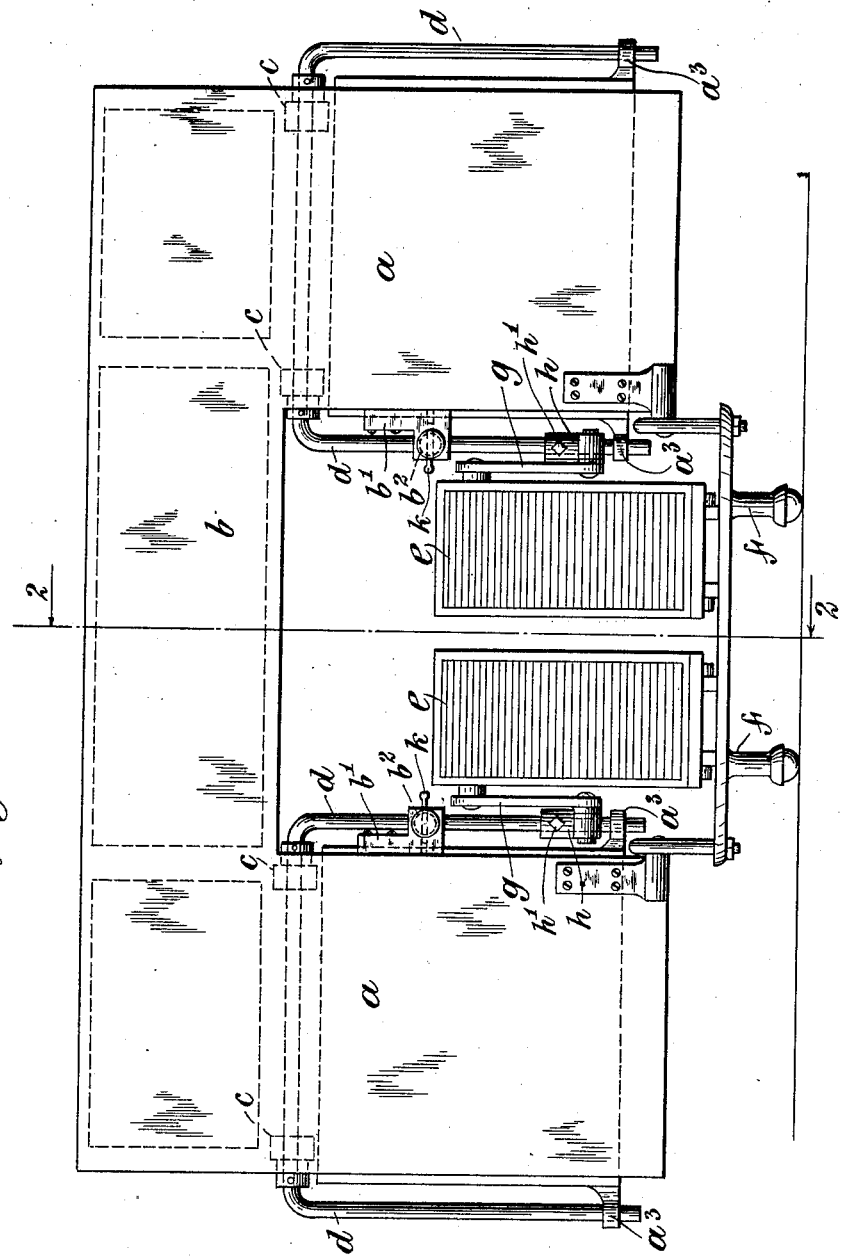

UNITED STATES PATENT OFFICE.

FRANK G. LYNDE, OF NEWARK, NEW JERSEY, ASSIGNOR TO LAUTER CO., OF NEWARK, NEW JERSEY, A CORPORATION OF NEW JERSEY.

FEEDER-BELLOWS.

1,098,453.  Specification of Letters Patent.  Patented June 2, 1914.

Application filed February 7, 1913. Serial No. 746,711.

*To all whom it may concern:*

Be it known that I, FRANK G. LYNDE, a citizen of the United States, residing in Newark, Essex county, in the State of New Jersey, have invented certain new and useful Improvements in Feeder-Bellows, of which the following is a specification, reference being had to the accompanying drawings, which form a part hereof.

In pneumatic piano players, as usually constructed, each bellows pedal is connected to its corresponding feeder bellows at one side only of the feeder bellows. The result is that in long continued use the movable member of the feeder bellows is more or less warped or twisted and leakage is apt to result, as well as an impairment of the action of the bellows. In accordance with this invention provision is made whereby such warping or twisting of the movable member of the feeder bellows is obviated and to this end the bellows pedal is connected to a hinged or pivoted rigid frame which surrounds or partly surrounds the feeder bellows and is connected to the movable member thereof at opposite sides so that in the operation of the feeder bellows there is no unequal stress upon the movable member of the bellows.

In the simple embodiment of the invention shown in the drawings, the interposed frame is a U-shaped frame formed by bending a rigid rod, the intermediate portion of the frame being mounted in suitable bearings adjacent to the hinge line of the movable member of the bellows, while each of the two end members is connected to the movable member near its free end. The bellows pedal is connected to one of the end members of the frame. The invention is also concerned with the provision of adjustable means for connecting the pedals to the frame of the feeder bellows, whereby the stroke of the latter may be quickly varied to suit different conditions of use.

The invention will be described more particularly with reference to the accompanying drawings in which—

Figure 1 is a view in front elevation of a supporting frame for the feeder bellows, showing the rigid frame for the movable members thereof and the connections between the bellows and said frames. Fig. 2 is a view taken on the plane indicated by the line 2—2 of Fig. 1 and looking in the direction of the arrows, the feeder bellows being indicated in collapsed position. Fig. 3 is a similar view showing the bellows in distended position.

Since the connections between each of the pedals and the respective feeder bellows are similar and the frames for the movable members of the bellows interchangeable, it is sufficient for the purpose of this description to consider one pedal only together with its bellows and the connections therebetween.

In Fig. 1 the feeder bellows $a$, $a$ are indicated in dotted lines and shown as supported by a suitable frame $b$, the nature of which is immaterial so far as regards the present improvements.

The feeder bellows $a$ comprises the usual immovable member $a'$ and the movable member $a^2$ hinged to the immovable member along one edge, as is usual. Adjacent the hinge line of the two members $a'$ and $a^2$ of the bellows $a$, and secured to the frame $b$, are suitable brackets $c$ which support the rigid frame for the movable member of the bellows, with which this invention is particularly concerned.

The frame herein illustrated is formed of a single rigid rod $d$ bent to form a U-shaped frame of substantially the same size and shape as the feeder bellows $a$. The frame $d$, as pointed out before, is pivotally or hingedly carried by the brackets $c$ adjacent the hinge line of the bellows members $a'$ and $a^2$. The movable member $a^2$ of the bellows $a$ has fixedly secured thereto adjacent its outer edge brackets $a^3$ which receive respectively the legs of the frame $d$. It will now appear that movement of the movable member $a^2$ of the bellows $a$ with respect to the immovable member $a'$ may be brought about by suitable connections between the rigid frame $d$ and its pedal. If the power for moving the movable member $a^2$ of the bellows be applied to only one leg of the rigid frame $d$, as will be the case usually, the entire frame $d$ will be rocked about its axis and by reason of its rigidity the parallelism of its two legs will be maintained. Since the two legs are connected respectively to the opposite side edges of the movable bellows member $a^2$ parallelism in the movement of these opposite edges of the bellows member will necessarily result. It is this absolute parallelism of movement which this invention seeks to secure and by reason thereof all twisting strains on the bellows are eliminated.

The pedals *e* herein illustrated may be supported by a suitable ornate frame *f* through a pivotal connection *e'* whereby oscillation of the pedal is permitted. The inner end of the pedal *e* may be secured to the frame *d* through a link *g*, attached to a slidable collar *h* carried on the frame *d*. This collar *h* may be provided with a set screw *h'* whereby the position of the collar with respect to the axis of rotation of the frame *d* may be varied. The construction employed is extremely simple and it will be understood that the collar *h* may be slid along the frame *d* and the stroke of the bellows *a* shortened or lengthened according as to whether the collar is moved away from or toward the axis of the frame.

The frame *b* may be provided with a depending block or bracket *b'*, preferably disposed at one side of the bellows *a* and in juxtaposition to one leg of the rigid frame *d*. This bracket may be provided with a recess $b^2$ adjacent its free edge to receive a spiral spring *i* which engages one of the legs of the frame. For the purpose of adjusting the tension of this spring, the function of which is to move the bellows to collapsed position, a pin *k* may be removably disposed across the recess $b^2$. This pin which passes through the coils of the spring *i* may be withdrawn and subsequently passed through other coils of the spring *i*, whereby the mean length and tension of the latter may be varied.

It is to be understood that while one of the simpler embodiments of the present invention has been shown herein, the construction of the frame *d* and the method of mounting the same operatively are both susceptible of modification and it is to be understood that all such modifications are to be deemed within the spirit of this invention provided that parallelism in movement of the opposed side edges of the movable member of the feeder bellows, is secured.

I claim as my invention:

1. In combination, a frame, a bellows having one member rigidly secured thereto, a metal rod securely fastened to the other member of said bellows, a pedal suitably supported at its lower end, and means connected to the upper end of said pedal and to the rod secured to a member of said bellows whereby the bellows may be properly operated though the height of the upper end of said pedal be varied.

2. In combination, a frame, a bellows having one member rigidly secured thereto, a substantially inverted U shape frame secured to the other member of said bellows and hinged to the first mentioned frame, a slidable collar and means for locking the same in position, mounted on one leg of the said U shaped frame, a pedal suitably supported at its lower end, a lever of suitable length pivoted at its one end near the upper end of said pedal and at its other end to said slidable collar, so that the positioning of the said slidable collar will determine the height of the upper end of said pedal.

3. In combination, a frame, a bellows having one member rigidly secured thereto, a rod having spaced side portions secured along the sides and top of the other member of said bellows and hinged at its top to said frame, torsional means secured to said frame and to the said rod, to thereby return the bellows to a closed position; a slidable collar and means for securing the same in a locked position mounted on one of the side portions of said rod, a pedal suitably mounted at its lower end, and a lever pivoted to the upper end of said pedal and the slidable collar whereby the bellows may be properly operated through the height of the upper end of said pedal be varied by adjusting the slidable collar.

This specification signed and witnessed this 31st day of January A. D. 1913.

FRANK G. LYNDE.

Signed in the presence of—
E. M. TAYLOR,
WORTHINGTON CAMPBELL.

---

Copies of this patent may be obtained for five cents each, by addressing the "Commissioner of Patents, Washington, D. C."